W. T. JONES.
LAMP.
APPLICATION FILED DEC. 9, 1908.
981,925.
Patented Jan. 17, 1911.
2 SHEETS—SHEET 1.
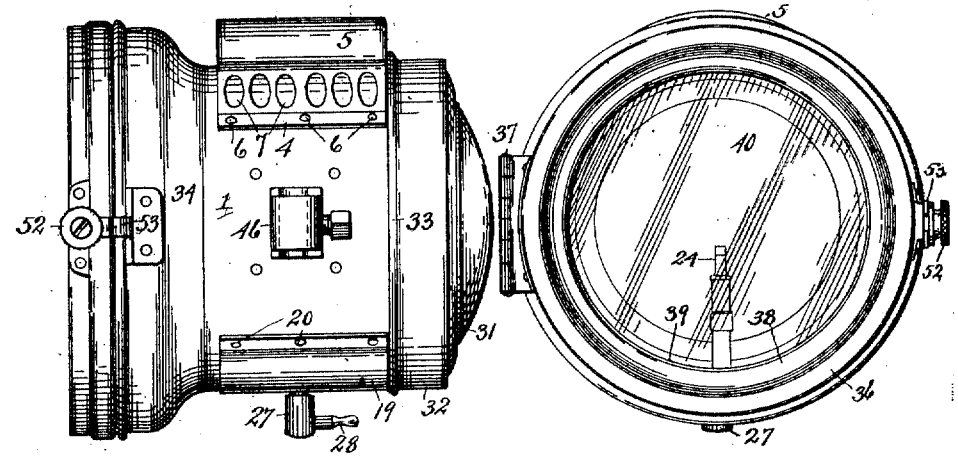
Fig. 1.    Fig. 2.
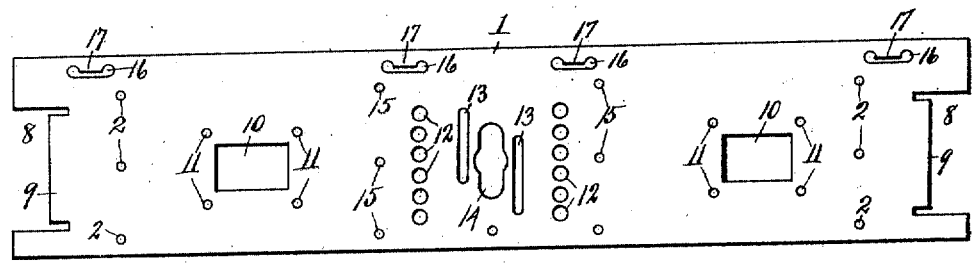
Fig. 3.
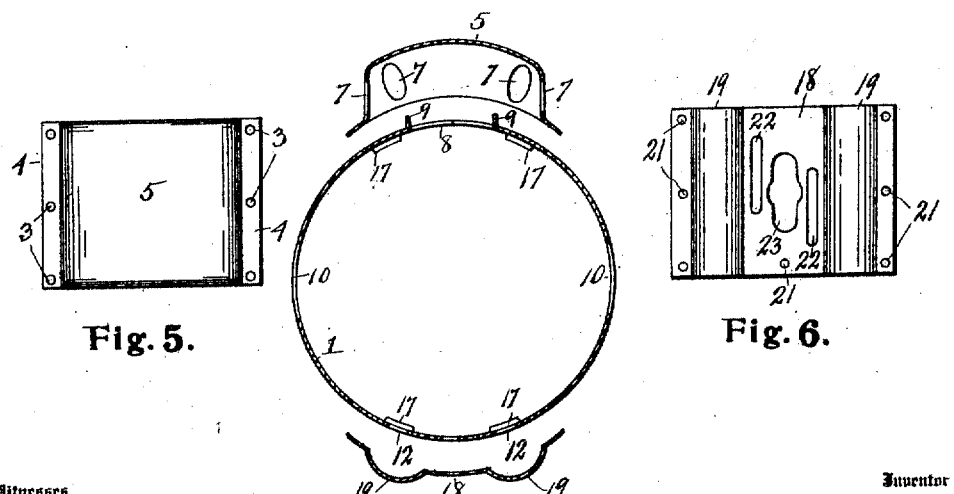
Fig. 5.    Fig. 6.
Fig. 4.
Witnesses
O. B. Baenziger
J. G. Howlitt
Inventor
William T. Jones
By T. D. Wheeler & Co.
Attorneys

W. T. JONES.
LAMP.
APPLICATION FILED DEC. 9, 1908.

981,925.

Patented Jan. 17, 1911.
2 SHEETS—SHEET 2.

Witnesses
O. B. Daenziger.
J. G. Howlett.

Inventor
William T. Jones
By T. L. Wheeler & Co.
Attorneys

UNITED STATES PATENT OFFICE.

WILLIAM T. JONES, OF DETROIT, MICHIGAN, ASSIGNOR TO EDMUNDS & JONES MFG. CO., OF DETROIT, MICHIGAN, A CORPORATION OF MICHIGAN.

LAMP.

981,925.  Specification of Letters Patent.  Patented Jan. 17, 1911.

Application filed December 9, 1908. Serial No. 466,604.

*To all whom it may concern:*

Be it known that I, WILLIAM T. JONES, a citizen of the United States, residing at Detroit, in the county of Wayne, State of Michigan, have invented certain new and useful Improvements in Lamps; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to new and useful improvements in lamps especially designed for use upon automobiles and motor vehicles, and consists in the construction and arrangement of parts hereinafter more fully set forth and pointed out particularly in the claims.

The primary object of the invention is to produce a lamp of the character described, wherein the arrangement is such as to facilitate the assembling of the parts, and provide for so joining the parts of the lamp to form a complete structure, as to enable the lamp to stand the jar and vibration incident to its use in connection with motor vehicles.

A further object is to provide for securely mounting the burner in a manner to enable the adjustment thereof for the purpose of regulating the focus of the lamp.

A further object is provide for securing the door so as to reduce the width thereof; to retain the glass securely therein, and at the same time preserve a comparatively smooth exterior.

A further object is to strengthen the wall of the body where it is subject to strain and to improve the construction generally.

The above objects are attained by the formation and association of parts illustrated in the accompanying drawings, in which:—

Figure 7:
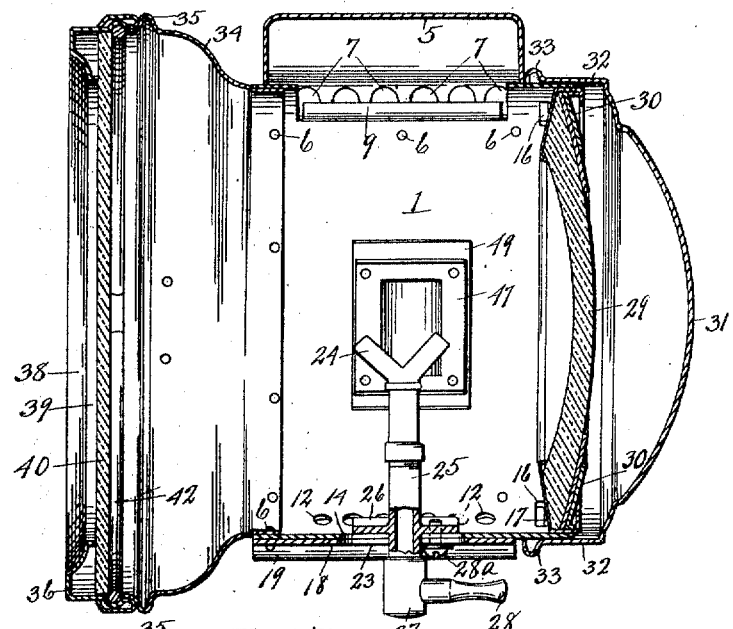
Figures 8, 9:
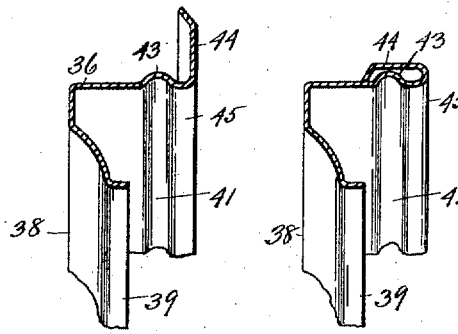
Figure 10:
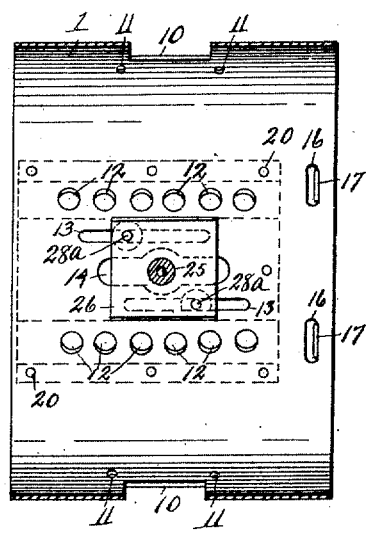
Figure 11:
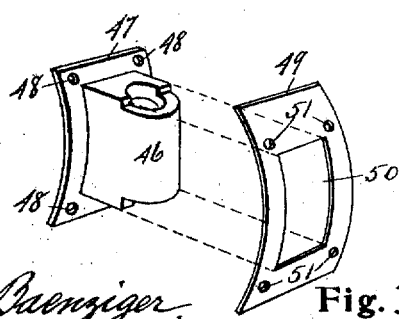

Figure 1 is a side elevation of a lamp embodying my invention. Fig. 2 is a front elevation thereof. Fig. 3 is a plan view of the blank from which the body of the lamp is formed. Fig. 4 is a transverse section through the cylindrical body of the lamp and through the ventilating panel and the hood or heat cap, said panel and cap being detached from the body of the lamp. Fig. 5 is a plan view of the heat cap. Fig. 6 is a plan view of the ventilating panel. Fig. 7 is a central longitudinal section through the lamp, the burner appearing in elevation. Fig. 8 is a fragmentary view in perspective of a portion of the door showing said part in a partial state of completion. Fig. 9 is a similar view showing said part completed in a manner to conceal the exterior bead formed thereon when making the internal channel therein, which receives the spring retaining ring that confines the glass in place. Fig. 10 is a horizontal section through the cylindrical body, showing the manner of adjustably mounting the burner tube through the lower arc thereof. Fig. 11 is a detail in perspective of one of the lugs carried by the body of the lamp which receives one of the forks of the lamp bracket, showing detached the reinforcing plate which is secured to the inner wall of the body and surrounds the opening therein through which said lug protrudes.

It has been customary in the manufacture of lamps of this character to join the ends of the cylindrical body portion by lapping said ends and soldering them together. In said method of joining the ends of the body it was difficult to hold them firmly in place during the operation of soldering. Any shifting of the end portions while being soldered would cause a variation in the diameter of the bodies, making it quite difficult to produce bodies of a uniform diameter, and causing a great deal of trouble and annoyance when assembling the parts of the lamp. To insure the formation of bodies of a uniform diameter, the blanks 1, from which the bodies are formed, when stamped out by means of suitable dies, are provided simultaneously with a row of apertures 2 near each end. These apertures are so positioned as to register when the body is rolled into cylindrical form, with the apertures 3 in the flanged margins 4 of the hood or heat cap which is also formed by suitable dies and which is placed upon the upper arc of the body of the lamp and is secured in place by rivets 6, as shown in Fig. 1, which pass through the apertures 3 in the flanges of said cap and through the apertures 2 in the body, whereby the ends of the body are joined through the medium of said cap, insuring lamp bodies of a uniform diameter. The hood as will be seen, is provided in its vertical walls with openings 7 for the escape of the caloric current from the burner within the flame chamber, said caloric current finding its way into the hood through the opening 8 in the body of the lamp, formed by cutting away a portion of the material of the body at the ends, as clearly shown in Fig. 3. The marginal portions of the opening 8 at the side are turned upwardly to form vertical flanges 9 (see Fig. 4) which serve as guards to prevent entrance into the body of the lamp of any substance which might pass through the openings 7 in the hood.

At the time the blank is struck out from which the body of the lamp is formed, in addition to the apertures 2 and openings 8, there are formed in said blank the openings 10 surrounded by the rivet apertures 11, the rows of ventilating openings 12, the parallel slots 13, the oblong opening 14 between said slots, the rows of rivet apertures 15, and the row of openings 16 along one margin of the blank into each of which extends from one side, a tongue-like member 17. The purpose of the apertures, openings, and slots in the blank of the body just described will be hereinafter fully explained.

The ventilating openings 12 which are formed through the lower arc of the body of the lamp are for the purpose of supplying air to the interior of the lamp body or flame chamber in a sufficient quantity to support combustion and prevent the temperature in the flame chamber rising to an excessive degree. For the purpose of covering the ventilating apertures 12 but at the same time providing for the entrance of air thereinto, a panel 18 is employed having the outwardly curved portions 19 that lie over the rows of apertures 12, said outwardly curved portions being open at their opposite ends, they serve as housings or inclosing passages through which air may enter the ventilating openings 12. The panel 18 is secured to the body of the lamp by means of rivets 20 (see Fig. 1) which pass through the apertures 21 in the margins of said panel and through the registering apertures 15 in the body of the lamp. The curved portions 19 of the panel are connected by a comparatively flat portion extending between them through which are formed slots 22 and an oblong opening 23. The slots 22 and the opening 23 in the panel register respectively with the slots 13 and the opening 14 in the lamp body. It will be noted that the lamp body is somewhat weakened by forming therein the apertures 12, the slots 13 and the opening 14. The panel 18 which is secured at its opposite ends to the body of the lamp on opposite sides of said openings and slots, serves as a reinforcement which strengthens the wall of the body at that point.

The burner 24 within the flame chamber is of the type commonly employed for burning acetylene gas and is mounted upon a stem 25 which passes through the opening 23 in the panel and the registering opening 14 in the body of the lamp, said stem carrying a rectangular plate 26 which lies upon and conforms to the curve of the inner wall of the lamp body. Attached to the lower or outer end of the stem 25 which projects through the body of the lamp is a fitting 27 to which is connected a tube 28 for attachment of a hose leading to the gas generator, not shown. Because of the fact that the stem 25 passes through the oblong openings 14 and 23, said stem may be adjusted longitudinally of said openings. To provide for locking the stem and burner against movement after proper adjustment thereof, screws 28$^a$ are employed which pass through the slots 22 and 13 in the cap and in the burner body respectively and screw into the opposite margins of the plate 26, whereby, by tightening said screws, the plate 26 may be securely locked in any desired position.

The reflector 29 which fits into the rear end of the lamp body is a circular disk concavo-convex in cross section, provided with the usual reflecting surface. Considerable difficulty has heretofore been experienced in mounting the reflector in the body of the lamp so that its axis will be parallel with the axis of the lamp body. To insure a perfect positioning of the reflector in the rear end of the lamp body, the tongue-like members 17 projecting into the apertures 16 along the rear margin of said body are turned inwardly to form abutments or inwardly extending shoulders, as clearly shown at 17 in Fig. 4, against which the margin of the circular frame 30 holding the reflector, is caused to bear as the reflector is placed within the rear end of the lamp body. These abutments or shoulders prevent the reflector entering farther on one side than on the other and maintain the axis thereof always parallel with the body of the lamp so that the rays of light projected from the concaved face of the reflector are caused to pass through the glass in the front of the lamp at a uniform angle on all sides.

The back of the lamp comprises a round central portion 31 and an annular forwardly extending flange 32 having a marginal bead 33. The flange 32 of the back of the lamp extends over the apertures 16 formed in the wall of the body in producing the abutments 17 thereby concealing said apertures. The back may be secured on the rear of the lamp body by soldering the flange 32 of the back to said body through the apertures 16, thus avoiding the use of rivets or bolts and presenting a smooth external appearance.

The front portion of the lamp body consists of a flaring extension 34 which is fitted within the forward end of the body of the lamp and riveted thereto. The outer end of said extension is provided with a bead 35 forming an annular shoulder which serves as a stop against which the door 36 of the lamp may close. Said door is hinged to the extension of the body of the lamp, as shown at 37 in Fig. 2, and comprises a circular frame having an inwardly extending portion 38 with a rearwardly bent margin 39 forming an annular shoulder or stop against which the glass 40 is adapted to bear. For the purpose of retaining the glass in place, a channel 41 is formed in the inner wall of the cylindrical portion of the door frame in which is adapted to be sprung an expansible steel ring 42 which bears against the inner face of the glass 40 so that said glass is confined between the ring and the shoulder or stop 39. In forming the channel 41 to receive the retaining ring 42, a bead 43 is caused to project from the outer face of the cylindrical portion of the door frame. To cover said bead and at the same time strengthen the edge of the door frame which embraces the outer edge of the projection of the lamp body, the inner marginal portion 44 of the door frame is turned outwardly and forwardly onto the main portion thereof so as to form a rolled edge 45 for the door frame, and to conceal the bead 43, producing a door which is very rigid and one whose exterior is comparatively smooth and pleasing in appearance. The above described method of forming the door frame is clearly shown in Figs. 8 and 9, Fig. 8 showing the marginal portion 44 extending outwardly before being folded onto the main portion of said frame, and Fig. 9 showing said marginal portion folded onto said main portion to complete the operation of forming the structure.

The forks of the lamp bracket, not shown, upon which the lamp is mounted, are received in the apertured lugs 46 which pass through the openings 10 (see Fig. 3) in the body of the lamp, and each of which is provided with an integral base flange 47 projecting laterally therefrom, parallel with the inner face of the wall of the body, said flange being provided with apertures 48 for the reception of rivets which may be employed to secure said lug in place. In order to afford a greater bearing surface for said lugs and distribute the strain incident to supporting the lamp over a larger area of the surface of the lamp body, each of said lugs is provided with a reinforcing plate 49 having an aperture 50 therein through which the lug passes, the margins of said plate being pierced, as at 51, for the reception of rivets. This reinforcing plate lies against the inner wall of the lamp body and between said wall and the flange 47 of the lug 46, the rivet holes 51 in said plate registering with the holes 48 in the flange of the lug so that said plate may be secured in position by the same rivets that are employed to retain the lug in place. By this arrangement the wall of the lamp body is materially strengthened at the point where the strain incident to supporting the lamp is brought to bear.

The movement of the burner longitudinally of the body of the lamp previously referred to, is for the purpose of properly focusing the burner with respect to the reflector. By loosening the screws 28ª, the burner may be moved longitudinally of the lamp body to effect such an adjustment thereof as to place it properly in focus, when said burner may be secured by tightening said screws.

The door of the lamp is held closed through the medium of a knurled set screw 52 carried thereon which engages a properly formed bracket 53 mounted on the extension 34 of the lamp body.

Having thus fully set forth my invention, what I claim as new and desire to secure by Letters Patent, is:—

1. In a lamp, a body portion comprising a strip of sheet metal forming a cylindrical shell or flame chamber, said strip at the point of meeting of its ends being provided with an aperture for the escape of the caloric current, and a ventilated heat cap fitted over said opening through which the caloric current may pass, the margins of said cap being riveted to the end portions of the sheet metal strip forming the body, to join said end portions through the medium of said cap, and at the same time secure said cap in place over said aperture.

2. In a lamp, a body portion comprising a sheet metal strip whose terminals meet to form a cylindrical flame chamber, the terminal portions of said strip being apertured to form an opening for the passage of the caloric current from said chamber, and a heat cap mounted over said opening and rigidly secured to the terminal portions of said strip to join the meeting ends thereof.

3. In a lamp, the combination of a cylindrical lamp body having a reflector in the rear thereof, said body being provided with ventilating openings through its lower wall, a panel forming housings for said openings, said panel being rigidly secured to the wall of the lamp body so that said housings will embrace said ventilating openings, and a burner tube passing through said panel and the lower wall of the lamp body and adjustably mounted therein.

4. In a lamp, the combination of a cylindrical body forming a flame chamber, a reflector in the rear of the flame chamber, said body having rows of ventilating openings through its lower side, a single piece panel forming housings which embrace said ventilating openings, said panel being rigidly secured to the exterior of the lamp body, the body of the lamp and said panel having registering slots therein, a burner tube passing through two of said registering slots, a plate rigidly secured to said tube within the flame chamber, and screws passing through other of said registering slots and engaging in said plate.

5. In a lamp, the combination of a cylindrical body having inwardly projecting shoulders formed near the rear end thereof and disposed in circumferential alinement, an independent reflector mounted in the rear end of said body and engaging said shoulders to aline its axis with the axis of the body, and a back independent of the reflector closing the rear of the body opening.

6. In a lamp, the combination of a cylindrical body having shoulders struck inwardly from the material of said body and located in circumferential alinement near the rear end of the body of the lamp, a reflector placed in the rear end of the lamp body against said shoulders, and a back closing the rear end of the lamp body having a marginal portion which extends onto the body of the lamp and closes the openings therein formed by striking said shoulders from the material of the body.

7. In a lamp, the combination of a circular door frame, said frame comprising an inwardly extending portion having a rearwardly bent margin forming a stop for the glass, a glass disk lying against said stop, the cylindrical portion of the door frame having a channel, a spring retaining ring in said channel confining said disk between it and said stop, the rear marginal portion of the cylindrical part of the door frame being turned outwardly and forwardly onto the body portion thereof to strengthen the edge of the frame and conceal the bead produced by forming the channel in which said retaining ring lies.

8. In a lamp, the combination of a cylindrical body portion forming a flame chamber, said body portion being provided in its opposite sides with apertures, flanged lugs having sockets for the lamp bracket passed through said apertures, and reinforcing plates between the flanges of said lugs and the wall of the lamp body.

In testimony whereof, I sign this specification in the presence of two witnesses.

WILLIAM T. JONES.

Witnesses:
O. B. BAENZIGER,
I. G. HOWLETT.